A. FRITSCHE.
CUP REMOVER.
APPLICATION FILED SEPT. 18, 1916.
1,223,162. Patented Apr. 17, 1917.
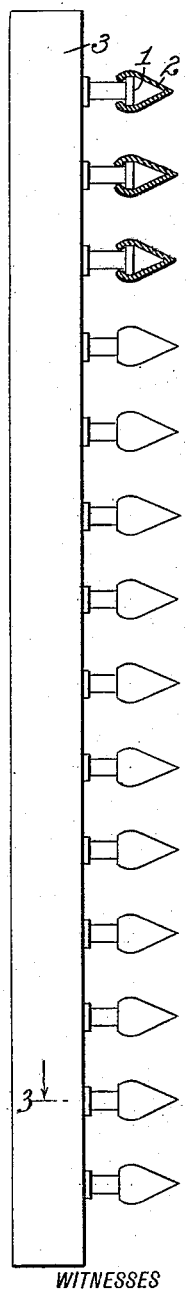
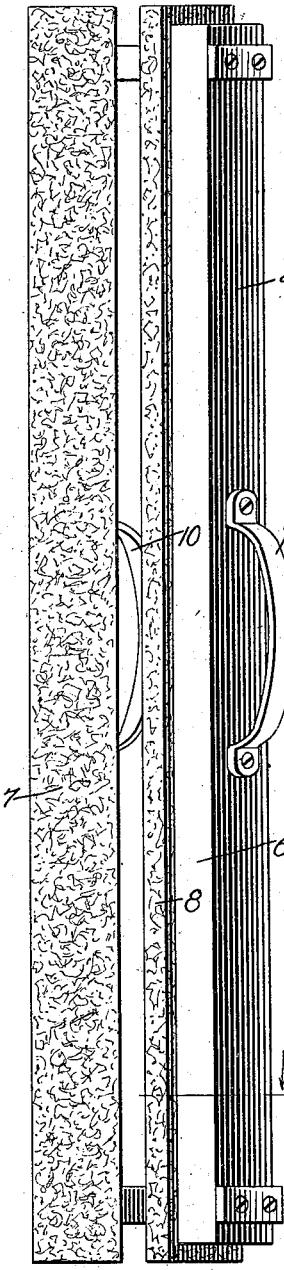
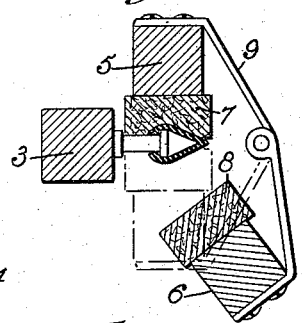
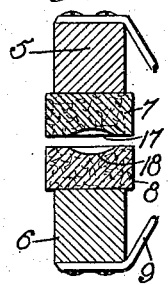
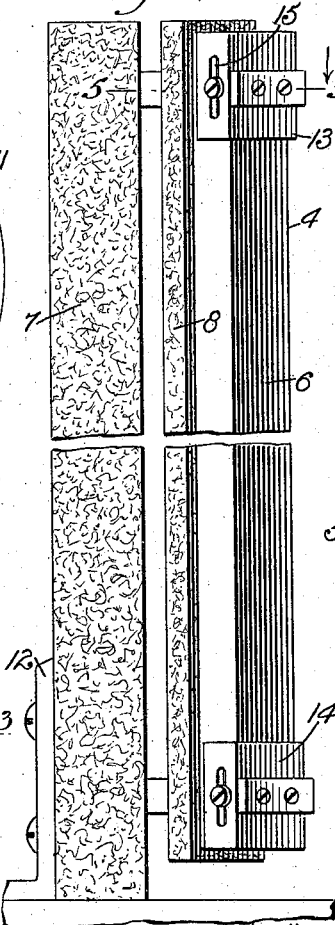
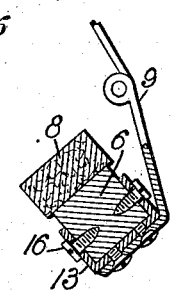
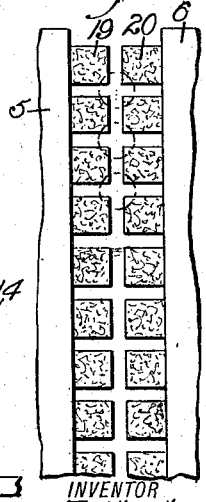

UNITED STATES PATENT OFFICE.

ANTONIE FRITSCHE, OF NEW YORK, N. Y.

CUP-REMOVER.

1,223,162.  Specification of Letters Patent.  Patented Apr. 17, 1917.

Application filed September 18, 1916.  Serial No. 120,702.

*To all whom it may concern:*

Be it known that I, ANTONIE FRITSCHE, a subject of the Emperor of Austria, and a resident of the city of New York, borough of Manhattan, in the county and State of New York, have invented a new and Improved Cup-Remover, of which the following is a full, clear, and exact description.

This invention relates to devices used in the manufacture of cups forming part of artificial flowers and has for an object the provision of an improved arrangement whereby the cups may be removed from their holders quickly and easily without injury.

Another object in view is to provide a clamping member having a cushion face formed to engage at different points the cups on their supports or forms in such a manner that when moved the cups will be removed.

A still further object in view is to provide a clamping member which may be stationary or supported by the hand, formed with a pair of cushioning members used in gripping cups on a holder or form preparatory to removing the same.

In the accompanying drawing:—

Figure 1 is an edge view of a holder or form on which artificial flower cups are cast.

Fig. 2 is a side view of a removing or clamping member disclosing one embodiment of the invention.

Fig. 3 is a section through Figs. 1 and 2 on line 3—3.

Fig. 4 is a view similar to Fig. 2 but showing a slightly modified structure of the invention.

Fig. 5 is a fragmentary sectional view through Fig. 4 on line 5—5.

Fig. 6 is a transverse sectional view through a slightly modified form of the invention to that shown in Fig. 3, the same being especially adapted for large cups.

Fig. 7 is a fragmentary front view of a slightly modified form of the invention to that shown in Fig. 4.

In producing artificial flowers that are in common use on the market today a rounded cup-shaped member is used at the base of the flower and to which the flower is secured as well as the stem. These cups are cast or formed from a specially prepared material, the casting being done upon forms 1 as shown in Fig. 1 so as to produce the cups 2. The form 1 is secured in any suitable manner to a bar 3. A large number of forms are preferably arranged on the same bar 3 whereby a large number of cups 2 may be cast. The bar 3, forms 1 and cups 2 have been in use for a large number of years and therefore form no part of the present invention.

Heretofore it has been necessary to remove the cups 2 by hand. According to the present invention a remover 4 is provided which will grasp simultaneously all of the cups 2 on the formers carried by bar 3 and remove the same simultaneously, whereas according to the old way each cup was removed by itself. The former 4 is provided with bars 5 and 6 to which felt or other cushioning members 7 and 8 are secured by any means, as for instance, adhesive. Hinges 9 are secured to the bars 5 and 6, as shown in Fig. 3, so that the bars may be separated or moved back and forth pivotally in order that one of the cushioning members, as for instance, member 7, may be placed against the cups 2 and then the cushioning member 8 forced against the same. The remover 4 is then pulled in a direction away from bar 3, whereupon the cups will all be removed from the forms 1. A slight up and down or wabbling motion may be given the holder 4 during the removal of the cups 2 so as to loosen the same from the forms 1. In order to better operate the bars 5 and 6 handles 10 and 11 are secured to said bars, as shown in Fig. 2.

In some instances, when a large number of forms 1 are arranged on the bar 3 the bar 5, for instance, is secured rigidly to a support 12, as shown in Fig. 4, while the bar 6 is mounted so as to freely swing toward and from bar 5. When bar 5 is held rigid by support 12 the hinges 9 are secured to channel irons 13 and 14, as shown more clearly in Fig. 5, said channel irons being provided with slots 15 through which the respective screws 16 pass, whereby said channel irons are held properly in position in respect to bar 6. Bar 6 may be moved vertically up and down sufficiently to give a slight turning movement to the various cups 2 during the removal thereof. It will be understood that the bar 3 is pulled away from the remover 4 when the arrangement shown in Fig. 4 is used, as the remover in that instance is fixed while bar 3 is a separate movable member.

In case large cups 2 are being manufactured the modified form of the invention shown in Fig. 6 is used. In this form the cushioning members 7 and 8 are provided with recesses 17 and 18 whereby larger sections of the cups are engaged in order to remove the same without injury. The structure shown in Fig. 7 is also used on large cups, said structure being the same as the preferred form except the cushions are arranged in blocks 19 and 20 whereby each cup 2 is engaged by one corner of four blocks, thus engaging the cups at a plurality of spaced points. In all forms of the invention means have been provided for engaging the cups at more than one point and for slightly loosening the cups during the removal thereof, whereby the cups are removed without injury.

What I claim is:

1. A cup remover comprising a fixed or stationary bar, a felt pad arranged on said bar, a pair of members pivotally connected to said fixed bar, a second bar slidingly mounted in said members, and a pad arranged on one face of said second bar adapted to be brought into contact with the pad on the fixed bar when said second bar has been moved to a closed position.

2. In a cup remover, a support, a cushioning pad arranged on said support, a member movable toward and from said cushioning member, a cushioning member arranged on said movable member, and means for supporting said movable member in such a manner as to allow a longitudinal movement thereof and a movement toward and from the first mentioned cushioning member.

3. As an article of manufacture for use with a plurality of artificial flower cup molds held in a predetermined relationship to each other, means for removing cups from said molds, comprising a pair of bars, hinges for connecting the bars together, said hinges being formed so that the pintle will be in line midway between the bars when the bars are moved to a closed position but spaced rearwardly therefrom for causing a greater radius of movement of said bars, and a felt cushioning member secured to each of said bars, said cushioning members being adapted to be brought toward each other and moved from each other as the bars are moved pivotally whereby the cups on said molds may be all grasped simultaneously and pulled from their support simultaneously.

4. As an article of manufacture for use with a plurality of artificial flower cup molds arranged in a straight line and against independent movement, means for simultaneously removing a cup from each of said molds comprising a pair of swinging members adapted to be swung from and toward each other, and a plurality of spaced cushioning blocks arranged on each of said swinging members, said blocks being adapted to grip the cups on said molds preparatory to removing the same.

ANTONIE FRITSCHE.

Witnesses:
RUDOLF FRITSCHE,
CLARA FRITSCHE.

Copies of this patent may be obtained for five cents each, by addressing the "Commissioner of Patents, Washington, D. C."